(12) United States Patent
Oren (10) Patent No.: US 7,856,587 B2
(45) Date of Patent: Dec. 21, 2010

(54) MEMORY REDUCTION IN DVB-H APPLICATIONS

(75) Inventor: Roy Oren, Magshimim (IL)

(73) Assignee: Siano Mobile Silicon Ltd., Kfar Netter (IL)

( * ) Notice: Subject to any disclaimer, the term of this patent is extended or adjusted under 35 U.S.C. 154(b) by 833 days.

(21) Appl. No.: 11/822,587

(22) Filed: Jul. 9, 2007

(65) Prior Publication Data

US 2009/0019508 A1    Jan. 15, 2009

(51) Int. Cl.
    *H03M 13/00*    (2006.01)
(52) U.S. Cl. .................. 714/762; 714/761; 714/788
(58) Field of Classification Search ............... 370/389; 375/240.26; 714/763, 765, 762, 761, 788
    See application file for complete search history.

(56) References Cited

U.S. PATENT DOCUMENTS

| 2008/0159279 A1* | 7/2008 | Younis et al. ............. 370/389 |
| 2008/0263428 A1* | 10/2008 | Eerenberg et al. .......... 714/762 |
| 2009/0003459 A1* | 1/2009 | Limberg ................ 375/240.26 |
| 2009/0006926 A1* | 1/2009 | Koppelaar et al. .......... 714/762 |
| 2010/0031121 A1* | 2/2010 | Ottavj et al. ............... 714/762 |

FOREIGN PATENT DOCUMENTS

WO    WO2006/085326    8/2006

OTHER PUBLICATIONS

ETSI R 102 377 (Feb. 2005) Digital Video Broadcasting (DVB): DVB-H Implementation Guidelines.

* cited by examiner

*Primary Examiner*—David Ton
(74) *Attorney, Agent, or Firm*—Eiten Mehulal Law Group (57) ABSTRACT

A method of storing DVB-H data from a DVB-H data burst, the method comprising: identifying erasures in the data burst; and storing non-erasure data from the data burst in memory locations of a memory that would be used to store erasures.

18 Claims, 10 Drawing Sheets

MEMORY REDUCTION IN DVB-H APPLICATIONS

FIELD

The invention relates to the Digital Video Broadcasting—Handheld (DVB-H) standard for providing multimedia services over digital terrestrial broadcasting networks to handheld devices.

BACKGROUND

DVB-H is a standard for broadcasting services, such as television, to handheld receivers and adapts the Digital Video Broadcast—Terrestrial (DVB-T) standard for digital terrestrial television to the specific requirements of handheld, battery-powered receivers. DVB-H has been adopted by, among other countries and regions, the USA and the European Community. Like DVB-T, DVB-H determines formats for the transmission of a compressed digital audio/video stream, appropriately modulated and coded for transmission and subsequent reception by the handheld receiver. DVB-H utilizes a time-slicing process for data transmission to reduce receiver power consumption and to enable smooth service handover. DVB-H also provides for multi-protocol encapsulation with forward error correction (MPE-FEC) that provide Forward Error Correction (FEC) to IP datagrams delivered in Multi-protocol encapsulation (MPE) packets as described below.

Multi-protocol encapsulation (MPE) is a data transmission format generally used to broadcast Internet protocol (IP) data, also known as IP datagrams, in packets referred to as MPE packets. IP datagrams, used interchangeably hereinafter with "datagrams" are formatted segments of consecutive data bytes that conform to an internet protocol. IP datagrams may vary in length such that each datagram may have a different number of bytes. In MPE each IP datagram is encapsulated in its own MPE packet which typically includes a section header, a 6 byte media access control (MAC) address in front of the datagram and a cyclic redundancy check (CRC) byte in the rear. The MAC address is the address of the receiver(s) to which the MPE packets are transmitted. The CRC is an error-detection technique used to check for errors in transmitted data. CRC is described in greater detail below. MPE packets are typically transmitted in MPE frames, each MPE frame comprising a plurality of MPE packets. The structure of a MPE frame is described in greater detail below.

Data transmission using time slicing involves sending data in bursts using significantly higher instantaneous bit rates compared to the bit rates required if the data were transmitted using traditional streaming mechanisms. It allows a receiver to go into a "stand-by" mode requiring minimal power consumption for considerable periods of time while not receiving. During reception, the receiver switches into an "on" mode requiring relatively high power but only for a time necessary to receive the data bursts. This saves considerable amount of power in the device. Handover refers to a receiver switching from a first communication channel for receiving data from a transmitting station to an alternate communication channel for receiving data from the same station when the first communication channel degrades to a degree that warrants changing to a different channel. Time-slicing enables smooth handover between different DVB-H service networks as the receiver can scan for stronger signals and perform a transition to the stronger signal in the period of time between transmission of bursts (while in "standby" mode).

Each burst of transmitted data carries a data structure called a MPE-FEC frame, i.e. a data frame comprising an MPE frame having MPE packets and a Forward Error Correcting (FEC) frame comprising a Reed Solomon (RS) data table used for correcting data in the MPE frame. The MPE-FEC frame is a data matrix having 255 columns and a maximum of 1024 rows and thereby a data capacity of up to about 2 Mbit (2,000,000 bits). The structure of an MPE-FEC frame is described in DVB-H standard ETSI R 102 377 (2005-02), Digital Video Broadcasting (DVB): DVB-H Implementation Guidelines, the disclosures of which are incorporated herein by reference.

In order to properly receive and process data in a 2 Mbit MPE-FEC frame transmitted in a burst, DVB-H implementation guidelines require that a DVB-H receiver have a minimum of 2 Mbit of memory for storage of data transmitted in the frame. For small equipment such as portable handheld devices a 2 Mbit memory is relatively large and expensive. PCT/IL2006/000179, System and Method for Mitigating Memory Requirements during MPE-FEC Processing, the disclosure of which is incorporated herein by reference, describes a method and a system for saving memory space in certain types of handheld and mobile devices.

The RS data table in an MPE-FEC frame comprises 64 parity bytes for performing forward error correction for every 191 bytes of data in the Application data table. The parity bytes are encapsulated and transmitted as a plurality of "FEC sections" in the FEC frame following the transmission of the MPE frame. Each FEC section in a FEC frame corresponds with a column in the RS data table, every column comprising the parity bytes included in the respectively corresponding FEC section.

CRC is an error-detection technique comprising a check performed on an IP datagram by the receiver that receives the datagram using a "CRC" byte that the transmitter that transmits the datagram generates and attaches to the datagram. The CRC byte is generated responsive to data in the datagram in accordance with a predetermined algorithm of any of various CRC algorithms known in the art. The receiver, when it receives the datagram generates its own CRC byte responsive to the data in the received datagram and the same predetermined CRC algorithm. The receiver then compares its own CRC with the transmitted CRC to determine if an error has occurred during transmission. If the transmitted CRC and the received CRC are the same, then the datagram is assumed to be error free and the datagram is considered "reliable". If the CRC's are different, then the datagram is flagged as comprising a byte in which an error has occurred. As it is not possible from the CRC to determine in which byte in the datagram an error has occurred, the whole datagram is considered "unreliable". Datagrams that are known to have an error are considered unreliable and are conventionally referred to as "erasures". All the bytes in an erasure are referred to as "erasure bytes".

There may be situations for which the CRC of a datagram actually comprising an error does not indicate the presence of the error and as a result the datagram is considered reliable. The byte or bytes comprising the undetected error are referred to as "error bytes". These situations have an extremely low probability of occurrence and are generally ignored.

RS codes are block-based error correcting codes generated by a RS encoder. To use RS codes, a data stream is organized into a series of code words prior to transmission. Each code word may consist of data bytes followed by several parity bytes. Upon reception, the receiver's RS decoder analyzes each code word according to an algorithm corresponding to that of the encoder in the transmitter, checks for errors and corrects the errors.

The number of bytes with errors, or byte errors, which may be corrected using RS error correction is based on the following equation:

$$2t+e \leq R,$$

where t=number of error bytes, e=number of erasure bytes, and R=number of redundancy bytes used in the RS code. Since CRC allows for the detection of practically all errors in the datagrams, the number of error bytes (bytes having an error not indicated by the CRC) may be considered negligible and only erasures are generally corrected by the RS decoder. The RS decoder is therefore able to correct twice a number of errors compared to a number that it could correct were erasures not identified (i.e. if CRC or some other error detection technique known in the art were not used). In DVB-H a 64-byte RS decoder can correct up to 64 bytes out of a 255 byte code word while, without erasures it would only be able to correct up to 32 bytes out of a 255 byte code word.

SUMMARY OF THE DISCLOSURE

An aspect of some embodiments of the invention relates to providing a method of processing transmitted DVB-H data configured in MPE-FEC frames that enables reduction in size of memory in a receiver of the data that is required to receive and process the data.

According to an aspect of some embodiments of the invention, data in a frame that is received by a receiver and is determined to be in error responsive to a CRC code comprised in the frame is not stored in the receiver memory.

According to an aspect of some embodiments of the invention, for a frame indicated by the CRC code as having errors, only that portion of FEC data comprised in the frame that is required to correct the errors is stored in the memory. FEC data that is not required for error correction is discarded. If no data in the frame is indicated by the CRC code to be in error all the FEC data comprised in the frame is discarded and none of the FEC data is stored in the memory.

According to an aspect of some embodiments of the invention, FEC data that is not discarded is stored in memory made available by not storing errors.

An aspect of some embodiments of the invention, relates to providing methods of configuring and managing memory made available by not storing errors, and storing FEC data in the "freed up" memory.

The inventors have found that by managing DVB-H data received in MPE-FEC frames in accordance with an embodiment of the invention, a DVB-H receiver that receives the data can receive and process the data with less memory than is required by the DVB-H standard. Optionally, the memory required in accordance with an embodiment with the invention is about 10% less than the memory indicated by the standard. Optionally the memory that is required is about 15% less. In some embodiments of the invention, the memory required in accordance with an embodiment of the invention is about 20% less than the standard memory. Optionally the memory is about 25% less than the standard memory.

BRIEF DESCRIPTION OF FIGURES

Examples illustrative of embodiments of the invention are described below with reference to figures attached hereto In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION

DVB-H implementation guidelines call for transmission of DVB-H data in time-sliced bursts, each burst comprising IP datagrams and FEC parity bytes contained within a single MPE-FEC frame. The size of a transmitted MPE-FEC frame is approximately 2 Mbit requiring that a DVB-H receiver, also referred to hereinafter as "receiver", include minimum 2 Mbit of memory storage space in order to receive and process the transmitted information.

The receiver's 2 Mbit memory storage space may comprise erasures, the result of errors introduced into the DVB-H information after transmission, which may only be corrected by the RS decoder during the decoding process As the buffer is functionally located in the front section of a receiver, before the decoder, these erasures take up valuable space in the receiver's memory. The disclosure relates to providing a method for reducing the amount of memory storage space required to receive DVB-H transmissions, and to providing a device and a system incorporating the method, based on not storing erasures in memory.

Figure 1:
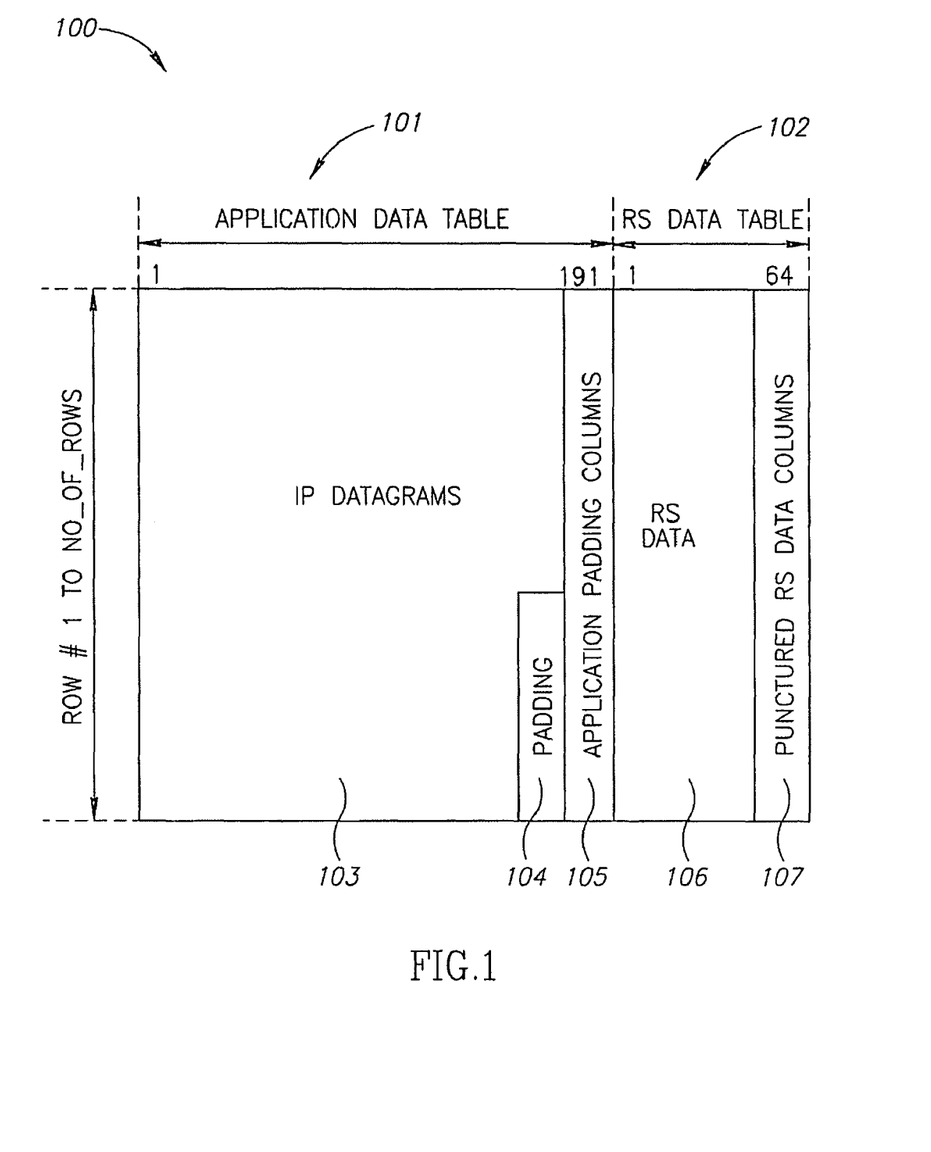
FIG. 1 schematically shows an exemplary structure of a MPE-FEC frame 100 currently used in the art in DVB-H transmissions.

Reference is made to FIG. 1, which schematically shows an exemplary structure of a MPE-FEC frame 100 currently used in the art in DVB-H transmissions, hereinafter referred to as "MPE-FEC frame". MPE-FEC frame 100 is arranged as a matrix with 255 columns and a variable number of rows, which may range from a minimum of 1 row to a maximum of 1024 rows. Generally, the MPE-FEC frame 100 will have 1024 rows. A typical MPE-FEC frame consists of an Application data table 101 and a Reed-Solomon (RS) data table 102. The Application data table 101 contains 191 columns (designated 1 through 191) that contain Internet Protocol (IP) datagrams 103. Columns or portions of columns in the Application data table 101 not occupied by IP datagrams 103 may be occupied by padding bytes. For example, Application data table 101 is shown containing one column partially padded 104 and additional padded columns 105. RS data table 102 contains 64 columns (designated 1 through 64) that contain RS data 106 comprising redundancy data, also known as "parity bytes", as part of the FEC. Some of the columns in RS data table 102 may include punctured RS data columns 107.

Each entry (located at intersection of each column×each row) in the matrix is a byte position and contains a data byte. IP datagram 103 includes header information and data. RS data 106 includes the parity bytes of the FEC code. Each byte entry in the Application data table 101, also referred to hereinafter as "IP data", has an address defined by a row and column number where the row address ranges from 1 to a maximum of 1024 and the column number ranges from 1 to 191. Similarly, each byte address in RS data table 102 has an address ranging from 1 to 64×no_of_rows.

Figure 2:
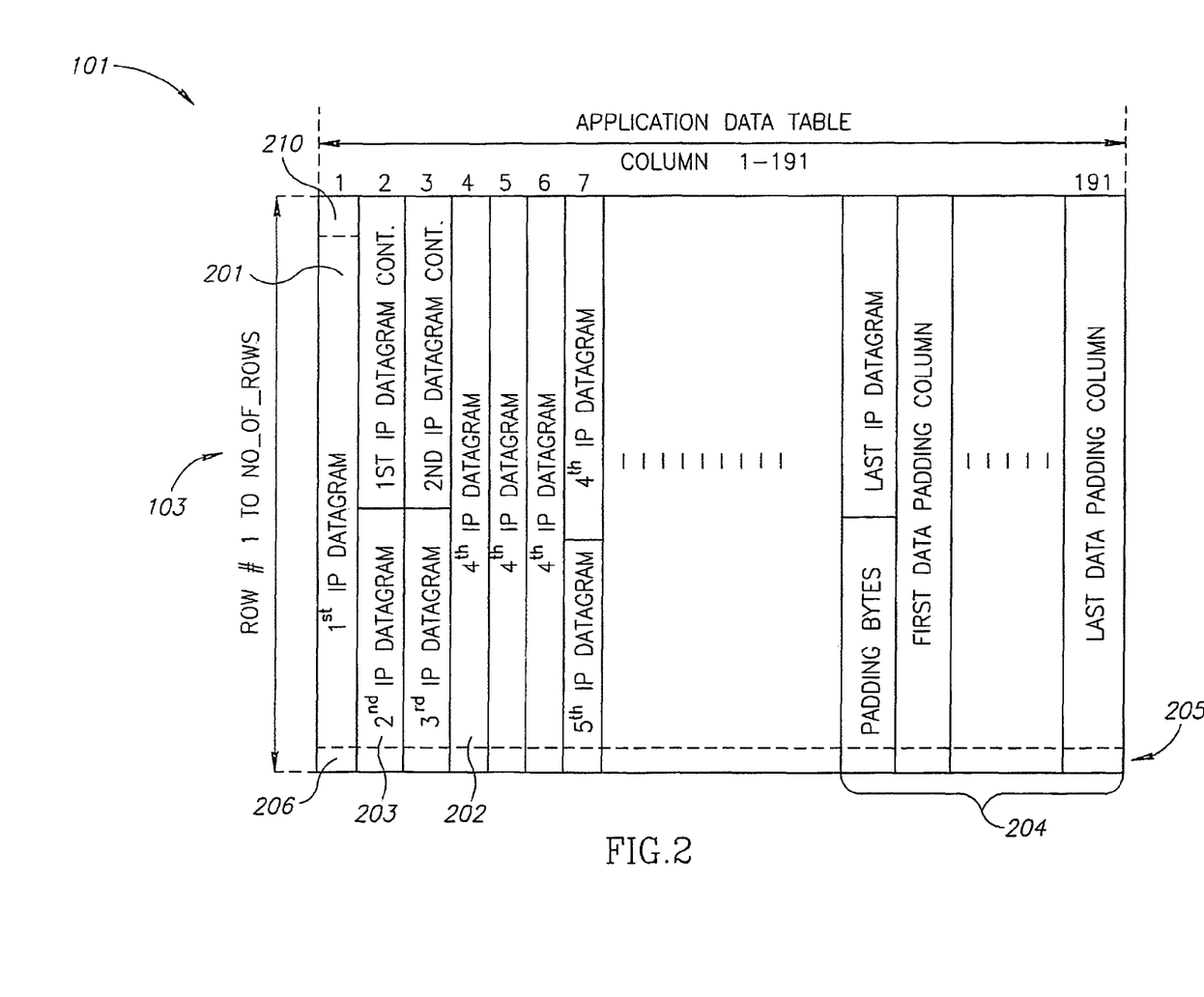
FIG. 2 schematically shows the exemplary Application data table 101 of the MPE-FEC frame 100 shown in FIG. 1 including IP datagrams.

Reference is made to FIG. 2 which schematically shows exemplary Application data table 101 of the MPE-FEC frame 100 shown in FIG. 1 including IP datagrams 103. In DVB-H transmissions IP datagrams 103 are sequentially transmitted, byte by byte, one datagram at a time in the order shown in Application data table 101, starting with the first byte of the first datagram in the upper left corner of the matrix, byte 210, and sequentially going down until the end of column 1, byte 206, then moving tip to the top of the column 2, then sequentially going down to the end of column 2 before moving up to the top of column 3, and so on, sequentially, until all bytes in all the IP datagrams 103 have been transmitted The length of the IP datagrams 103 may vary from one to another, according to the actual data content included in each particular datagram. For example, a first datagram transmitted $1^{st}$ IP datagram 201, is shown fully occupying column 1 and approximately half of column 2. The second datagram $2^{nd}$ IP datagram 203, is shown following $1^{st}$ IP datagram 201 and occupies approximately half of column 2 and column 3. The fourth datagram, $4^{th}$ IP datagram 202 is shown occupying all of columns 4, 5, 6 and a portion of column 7. When all IP datagrams 103 have been entered into the Application data table 101, unfilled byte positions may be padded with padding bytes, for example padding bytes 204 which may be similar or the same to that shown at 104 and 105 in FIG. 1, thereby completely filling all 191 columns. For convenience the term padding bytes may be used interchangeably with "0 bytes". The number of padding columns in each MPE-FEC frame is generally transmitted to the receiver in the FEC section of the MPE-FEC, hereinafter referred to as "FEC section".

In DVB-H IP datagrams are encapsulated in MPE packets, regardless of whether FEC is used or not. This enables receivers lacking MPE-FEC reception capabilities to receive only the MPE packets. Each MPE packet comprises a start address for the IP datagram. This start address indicates the byte position in the Application data table of the first byte of the particular IP datagram. The receiver may then put the received IP datagram in the correct byte positions in the Application data table and mark these positions as reliable for the RS decoder provided that the CRC indicates that the IP datagram is correct.

The last column of the Application data table contains a "table_boundary" flag in a row which serves to indicate the end of the IP datagrams. If all datagrams within the Application data table have been received correctly (CRC result is positive, verifies no errors), the receiver does not require any FEC sections to use as RS data for decoding and may therefore discard the FEC sections it receives. In cases where FEC sections are received, the exact number of padding columns in the Application data table is indicated (signaled using eight dedicated bits) in the section header of the FEC sections. With all the leftmost 191 columns filled, it is possible for the decoder to calculate for each row 64 parity bytes from the 191 bytes of IP data (and possible padding bits) as each row is associated with one RS code word.

Figure 3:
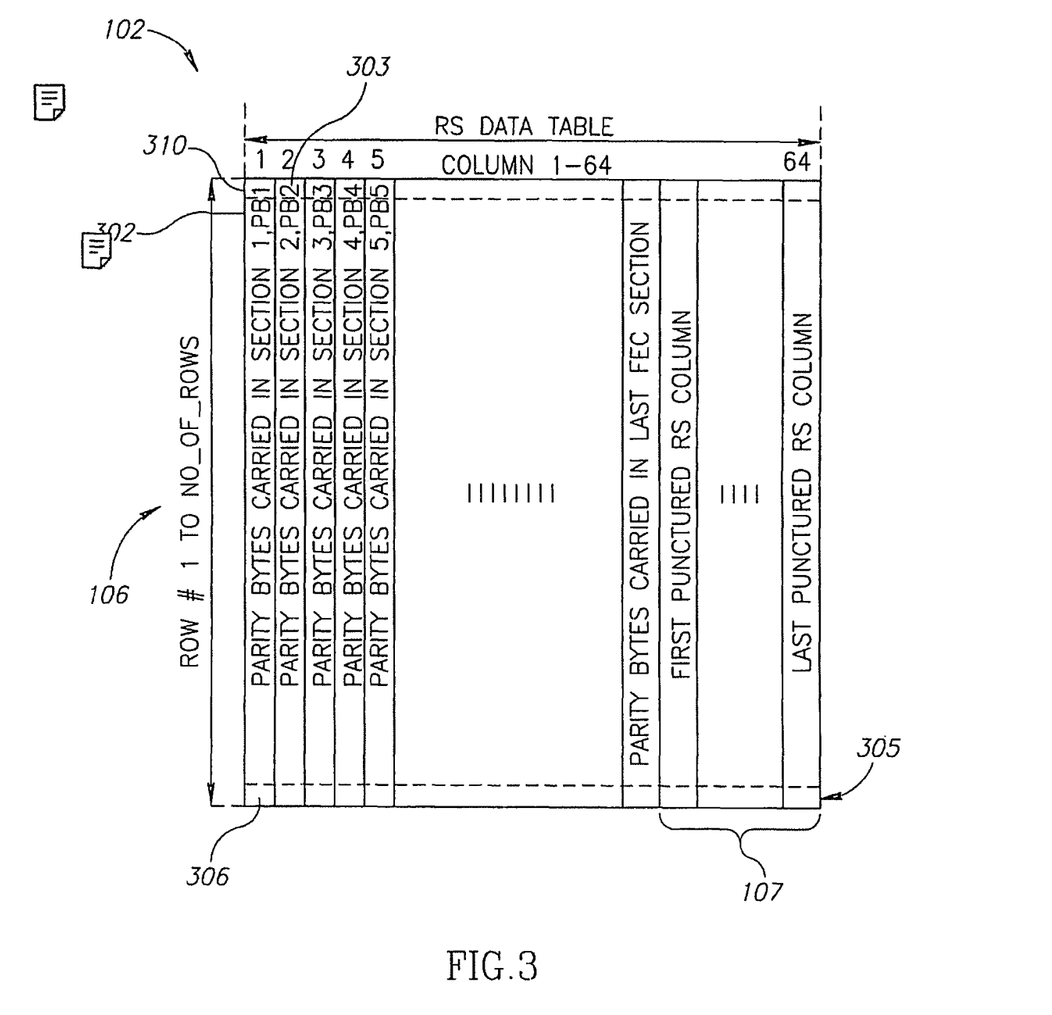
FIG. 3 schematically shows the exemplary RS data table of the MPE-FEC frame shown in FIG. 1 including parity bytes and punctured columns.

Reference is made to FIG. 3 which schematically shows the exemplary RS data table 102 of the MPE-FEC frame 100 shown in FIG. 1 including parity bytes 106, and punctured columns 107. RS data table 102 is shown consisting of 64 columns (1 through 64), each column comprising the redundancy data 106 included in the FEC section, for example, the redundancy data in FEC section 2, PB2 303. The RS data 106 are sequentially transmitted, byte by byte, one FEC section at a time in the order shown in RS data table 102, starting with the first byte of the RS data in the upper left corner of the matrix, byte 310, and going down until the end of the first column, byte 306. The RS data associated with each IP datagram in the Application data table, for example, $4^{th}$ IP datagram 202 in Application Data Table 101 in FIG. 2, occupies one column in the RS data table, for example, column 4 in RS data table 102.

The process by which the RS decoder corrects datagrams involves handling one row after another in the MPE-FEC table, such that for each row in the Application data table 101 in FIG. 2, the RS decoder utilizes parity bytes in the corresponding row in the RS data table 102. For example, the RS decoder may correct the last row 205 in Application data table 101 by utilizing the parity bytes in the corresponding last row 305 in RS data table 102. Portion 107 of RS data table 102 contains punctured RS columns which are introduced by the receiver in place of FEC parity bytes not transmitted in an effort to reduce bandwidth requirements.

IP datagrams are checked by a CRC-32 code, a 32-bit CRC which reliably detects if there were any errors within the IP datagram (the probability for misdetection is negligable). For every correctly received datagram the receiver looks in the header of the MPE packet comprising the datagram for the start address of the datagram in the Application data table so as to determine its position within the MPE-FEC frame. MPE packets may optionally contain a checksum procedure instead of using CRC-32 to check the datagrams. All correctly received bytes, including Application data padding, can then be marked as reliable bytes and all erroneous bytes can be marked as erasure bytes in the RS decoding.

All byte positions within the MPE-FEC frame (Application data table and RS data table) are now marked as either reliable bytes or erasure bytes. The RS decoder is able to correct up to 64 erasure bytes per 255-byte codeword. If there are more than 64 erasure bytes in a row, the RS decoder will not be able to correct the errors.

By introducing a certain number of 0 bytes in the padding columns in the rightmost part of the Application data table, it is possible to make the RS code stronger, meaning that more actual errors may be corrected. These padding columns are only used for the calculation of parity bytes; that is, these padding columns are not transmitted. In the receiver they are reintroduced and marked as reliable for the RS decoder. With 127 padding columns, for example, there are 64 columns left for IP data. With the 64 parity columns the effective code rate of the code becomes half, which means that, effectively, the number of parity columns equals the number of data columns. For the case of 191 IP data columns and 64 parity columns the effective code rate is 3/4. However, the price for this is the effective codeword length being roughly decreased by 50%, since, instead of transmitting 255-byte long code words, only 128-byte long code words can be transmitted. The number of application data padding columns is variable and specified in the MPE packets. The allowed range of padding columns is 0-190.

An effectively weaker code may be achieved by puncturing. Puncturing is performed, by discarding one or more of the last RS data columns. The number of discarded (punctured) RS columns may vary between MPE-FEC frames within the range 0 to 64, and can be calculated as 64—last_FEC section_number, except for cases where no RS columns are transmitted in which case there are 64 punctured columns. Puncturing will decrease the overhead introduced by the RS data and thus decrease the needed bit rate (reduce bandwidth requirements). The drawback of puncturing lies in that it is relatively a weaker code.

Figure 4:
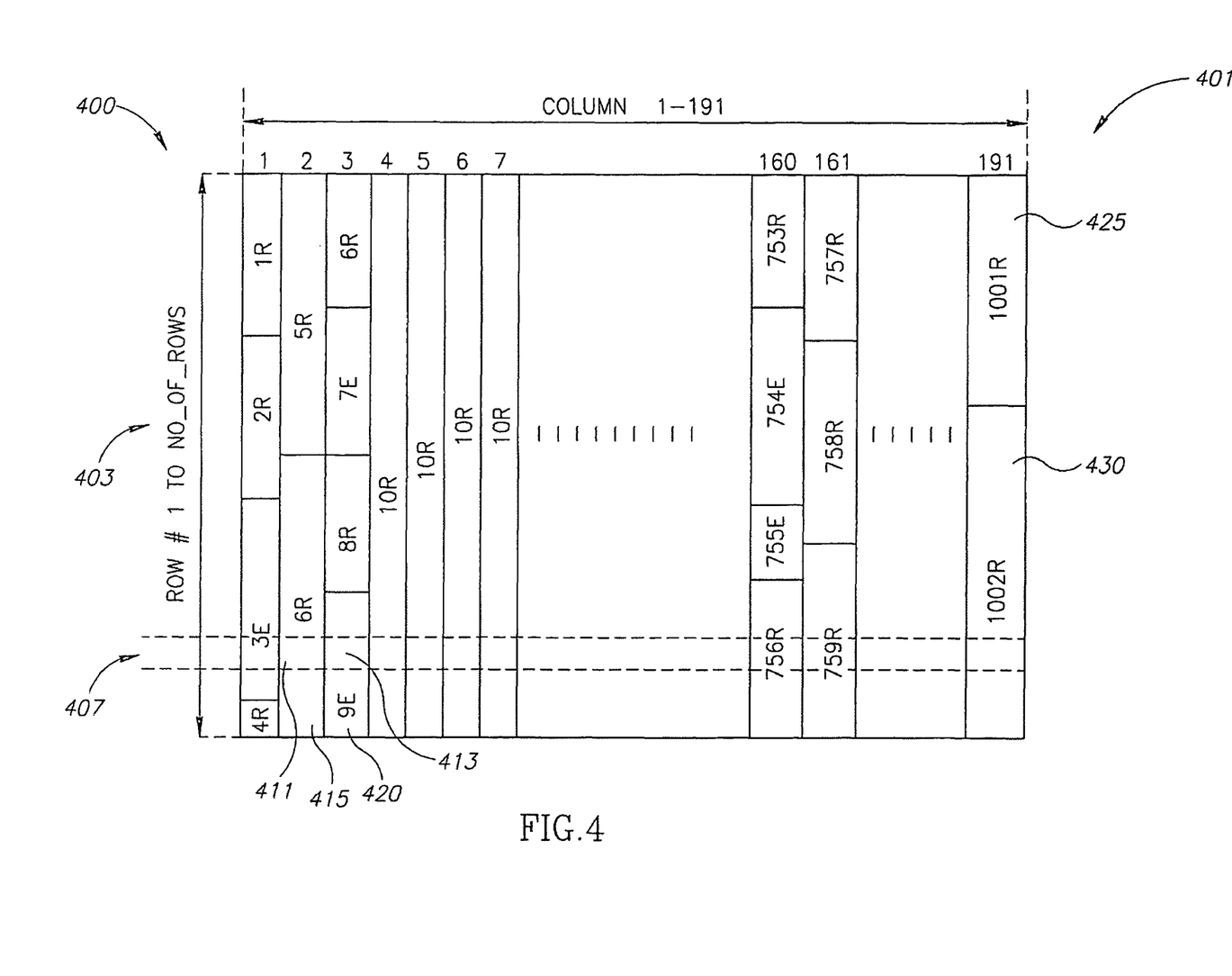
FIG. 4 schematically shows an exemplary Application data table of a MPE-FEC frame following reception of an exemplary DVB-H time-sliced data burst, as currently known in the art.

Reference is made to FIG. 4 which schematically shows an exemplary Application data table 401 of a MPE-FEC frame 400 following reception of an exemplary DVB-H time-sliced data burst, as currently known in the art. The exemplary Application data table 401 illustrated in FIG. 4 may also be used in some embodiments of the present disclosure. For convenience, Application data table 401 may be referred to hereinafter as "table 401".

Table 401 includes a plurality of IP datagrams 403, each datagram identified by a number followed by the letter "R" or "E". The IP datagrams 403 are arranged sequentially according to the order in which they were received, represented by the number identifying each IP datagram 403. The letter "R" attached to a number identifies a datagram as being successfully received, that is, the CRC check or the check-sum test showed that each byte in each byte position in the datagram is reliable. For example, datagram 6R 415 was reliably received, as all bytes, including that in column 2 row 407, byte position 411, checked reliably. The letter "E" attached to a number identifies a datagram as being erroneously received, that is, the CRC check or the check-sum test showed errors in one or more of the bytes received in the datagram. These datagrams are termed "erasures". For example, datagram 9E 420 contains one or more byte errors, including that at column 3 row 407, byte position 413. Table 401 shows all 191 columns filled with reliable datagrams and erasures. For example, the last two datagrams received filling the table are datagram 1001R 425 and 1002R 430, both reliably received as indicated by the letter R.

The datagrams shown in table 401, both reliable and erasures are for illustrative purposes and not intended to be limiting in any manner. Table 401 may include any number of datagrams and erasures as long as they do not exceed the maximum space assigned to the Application data table of a MPE-FEC frame used in DVB-H transmissions. Furthermore, columns or parts of columns not occupied by datagrams may be filled by padding bytes.

In accordance with an embodiment of the present disclosure, transmitted MPE-FEC frames conforming to the guidelines of the DVB-H standards may be received and properly handled by a DVB-H receiver with buffer size less than the 2 Mbit size recommended by the DVB-H standard. The following exemplary method for memory space reduction, in accordance with an embodiment of the present disclosure, is based on not inserting erasures into memory, and replacing their originally intended location in memory, hereinafter referred to as "vacant positions" or "vacant byte positions", with reliable bytes from reliable datagrams received afterwards. The method enables subsequently received RS data bytes to be inserted into the vacant positions in the Application data table thereby eliminating the need for memory space to store the RS data table. The method may contribute to up to 25% reduction in memory space requited to store a MPE-FEC frame. For convenience, an Application data table which does not contain erasures shall be referred to hereinafter as "reduced table".

Accountability of the erasures is maintained through an Erasure Section List (ESL) for subsequent RS decoding of the received IP datagrams. Each IP datagram that fails the CRC (an erasure) has its address and length recorded in the ESL after the CRC check and is discarded prior to being inserted into memory.

The method is executed on a row-by-row basis in the Application data table stored in memory, and includes shifting reliable bytes positioned in higher-numbered columns into adjacently located vacant positions in lower numbered columns in the same row. Furthermore, each shifting of a reliable byte frees up the byte position it previously occupied so that its position is filled by shifting the next reliable byte in the same row adjacently located in a higher numbered column. The reliable byte shifting process from higher-numbered columns to lower-numbered columns in each row is an iterative process until all reliable IP data throughout the 191 columns of the Application data table have been shifted. In each row this will result in byte positions remaining unoccupied in the higher-numbered columns as the reliable bytes have been shifted. For convenience, unoccupied byte positions which are not vacant positions will hereinafter be referred to as "free positions" or "free byte positions":

The free positions are occupied by RS data bytes from the FEC as they arrive at the buffer. Each FEC section occupies a whole column in the RS data table and is the same length as the columns in the Application data table, so that each parity byte arriving is associated with a specific row in the Application data table. Therefore, as the first FEC section arrives the parity bytes are shifted into the first free byte position in the lowest numbered column in each row of the Application data table corresponding to the same row allocated in the RS data table to the parity bytes. This process is repeated with the second FEC section, and subsequently with all FEC sections until all 191 columns in all rows of the Application data table are full.

Monitoring of the number of columns filled in each row with reliable bytes and parity bytes may be performed with a counter. The counter essentially needs to keep track that the reliable bytes and parity bytes in the row will sum up to 191 at which time the row is considered full. Additional parity bytes received for each row may be discarded after the row fills up. If the counter shows that the row is filled up with reliable bytes only (191 reliable bytes in the row) parity bytes are not required and may be discarded.

Figures 5A, 5B:
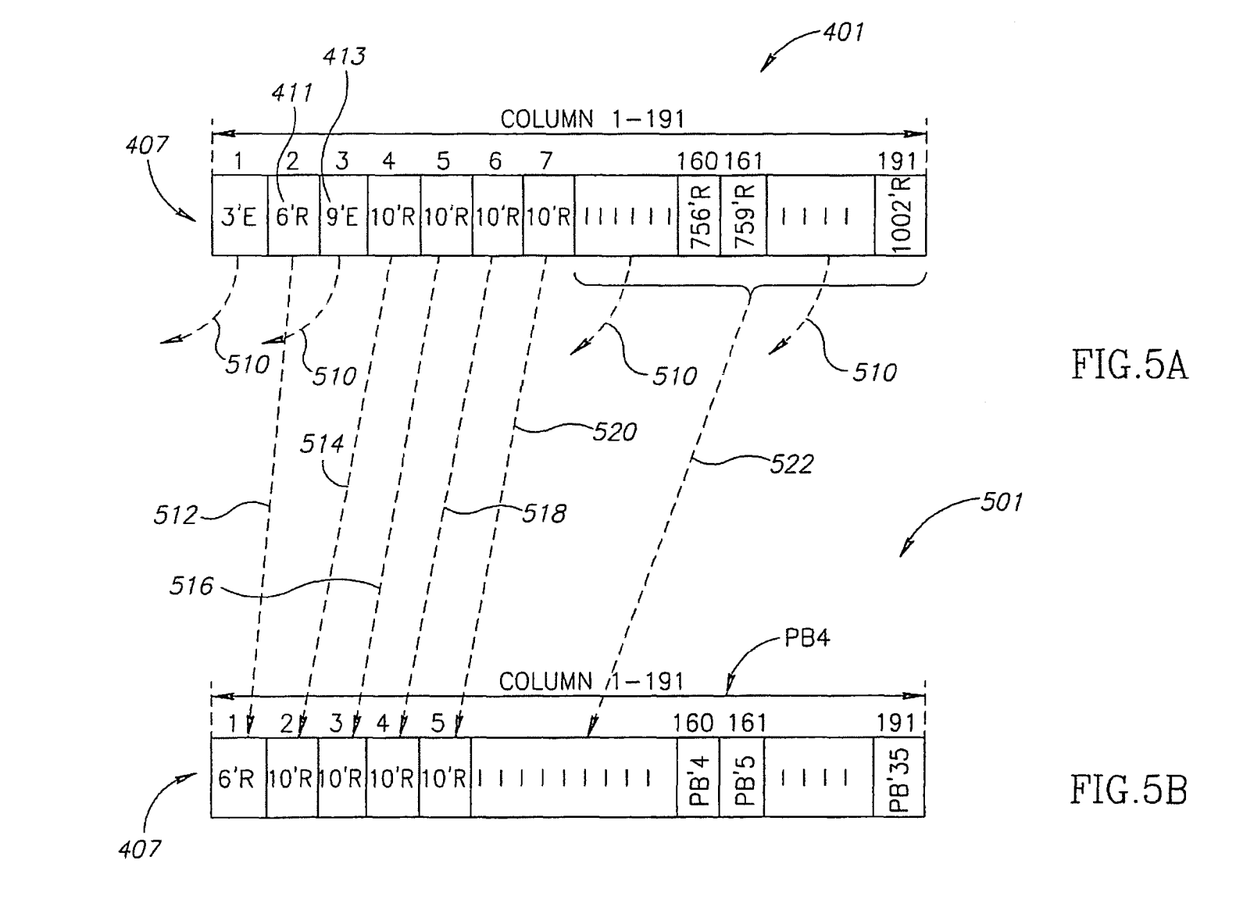
FIG. 5a schematically shows an exemplary row in the Application data table of FIG. 4 comprising erasure bytes.
FIG. 5b schematically shows an exemplary row in a reduced table after shifting reliable and parity bytes in accordance with an embodiment of the present disclosure.

Reference is made to FIGS. 5*a* and 5*b* which schematically show exemplary row 407 in the Application data table 401 of FIG. 4 comprising erasure bytes, and exemplary row 407 in reduced table 501 following the shifting of reliable bytes and parity bytes into vacant positions and free positions, in accordance with an embodiment of the present disclosure. For convenience, individual datagram bytes ale identified by the number of the datagram to which they belong followed by a "prime" symbol, ', and the attached letter "R" or "E" identifying the bytes as reliable or as erasure bytes. For example, byte 6'R 411 is a reliable byte located in column 2 row 407 and is part of datagram 6R 415 in FIG. 4. Byte 9'E 413 is an erasure byte located in column 3 row 407 and is part of erasure 9E 420 in FIG. 4.

In FIG. 5a row 407 includes erasure bytes in column 1 and in column 3. In addition there may be a plurality of erasures (not shown) included among reliable bytes located between columns 7 and 160 and between columns 161 and 191. The non-insertion of the erasures into row 407 is shown by the arrows at 510. Filling up the vacant position in column 1, 3'E, is done by shifting the adjacent reliable byte in column 2, 6'R into column 1, indicated by dashed arrow 512. Filling up the vacant position in column 3, 9'E, is done by shifting the adjacent reliable byte in column 4, 10'R into column 3, not shown. This leaves free byte positions in column 2 and column 4 so that the reliable byte in column 3, byte 10'R, originally in column 2, moves into column 2, indicated by dashed arrow 514, and that in column 5, 10'R, moves into column 4, not shown. This leaves byte positions in column 3 and column empty so that the reliable byte in column 4, byte 10'R, originally in column 5, moves into column 3, indicated by dashed arrow 516, and that in column 6, 10'R, moves into column 5, not shown. This leaves byte positions in column 4 and column 6 empty so that the reliable byte in column 5, byte 10'R, originally in column 6, moves into column 4, indicated by dashed arrow 518, and that in column 7, 10'R, moves into column 6, not shown. This leaves byte positions in column 5 and column 7 empty so that the reliable byte in column 6, byte 10'R, originally in column 7, moves into column 5, indicated by dashed arrow 520, and that in column 8, not shown, moves into column 6, not shown. Subsequently, all reliable bytes continue to shift from higher number columns to lower number empty columns in the same row until all reliable bytes are finished, indicated by dashed arrow 522.

FIG. 5b, row 407 shows the final result of the byte shifting process applied to row 407 of FIG. 5a. The shifting process results in a plurality of unoccupied byte positions in each row extending from the column following the last shifted reliable byte to column 191. These free byte positions are occupied by parity bytes arriving into the buffer. Each byte position in a row is filled by a parity byte from the same row in the RS data table. For example, parity byte PB'4, occupying column 160 row 407 in reduced table 501, is a parity byte from FEC section 4, PB4 originally intended to occupy column 4 row 407 in an RS data table (not shown) associated with the Application data table 401. In the example illustrated in FIG. 5b row 407 is filled with reliable bytes from row 407 of FIG. 5a and with parity bytes from row 407 columns 1 through 35 in the RS data table associated with table 401. Row 407 occupies a total of 191 columns.

Figure 6:
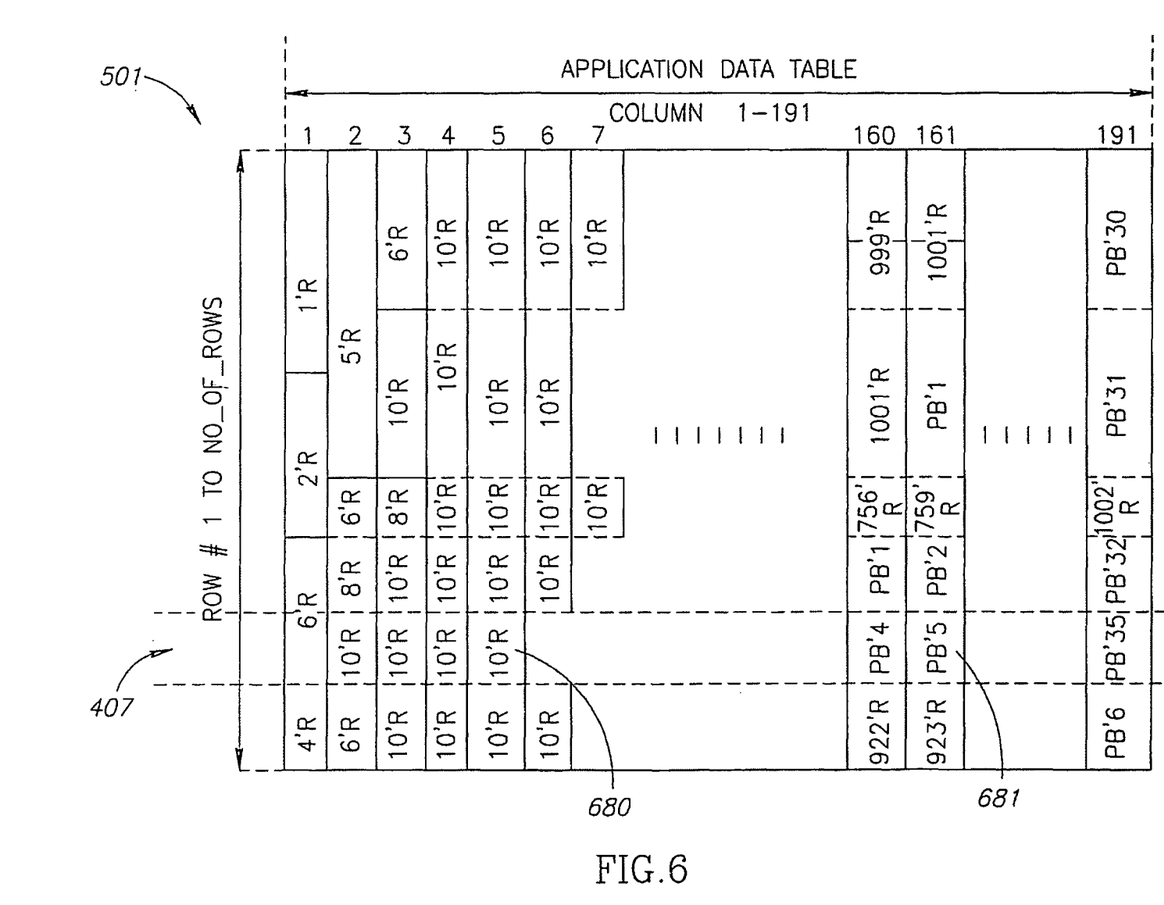
FIG. 6 schematically shows the exemplary reduced table of FIG. 5 in accordance with an embodiment of the present disclosure.

Reference is made to FIG. 6 which schematically shows the exemplary reduced table 501 representing the Application data table 401 of FIG. 4 following application of the method to each row in table 401, in accordance with an embodiment of the present disclosure. All rows are rearranged such that there are no erasure bytes and all 191 byte positions in each row are occupied by reliable bytes and/or parity bytes. For example, reliable byte 10'R 680 is located in column 5 row 407 and in column 161 row 407 is located parity byte PB'5 681.

In order to reconstruct the original data transmitted it is necessary to decode the received IP datagrams using an RS decoder in the receiver corresponding with the RS encoder in the transmitter. A problem exists as the MPE-FEC frame to be decoded is different than that encoded; the erasures are omitted and the location of all reliable bytes and parity bytes have been shifted. The ESL is used to solve this problem.

The ESL is essentially a list stored in memory in which is recorded, for each erasure, its address in the Application data table and the length of the erasure. The memory storage requirements for the ESL information are significantly less than that required to store the erasure.

When the data in memory is ready to be decoded, the ESL is accessed by a controller in the receiver, which uses the information available on the erasures to transfer the reliable bytes and the parity bytes to the decoder according to their original position within the MPE-FEC frame. Decoding of the data stored in memory is done row-by-row in the reduced table. The controller checks the ESL to see the original position of erasure bytes within each row of the Application data table, goes through each line in the reduced table stored in memory, then sends each row for decoding, the timing in the transfer of the reliable bytes and parity bytes taking into consideration the timing required to transfer the erasure bytes should they not have been removed. Essentially, in each row each reliable byte and parity byte following an erasure byte is shifted over one byte for each erasure byte that appears before it. The decoder then reads the empty positions between the reliable bytes and parity bytes as erasure bytes.

Figure 7A:
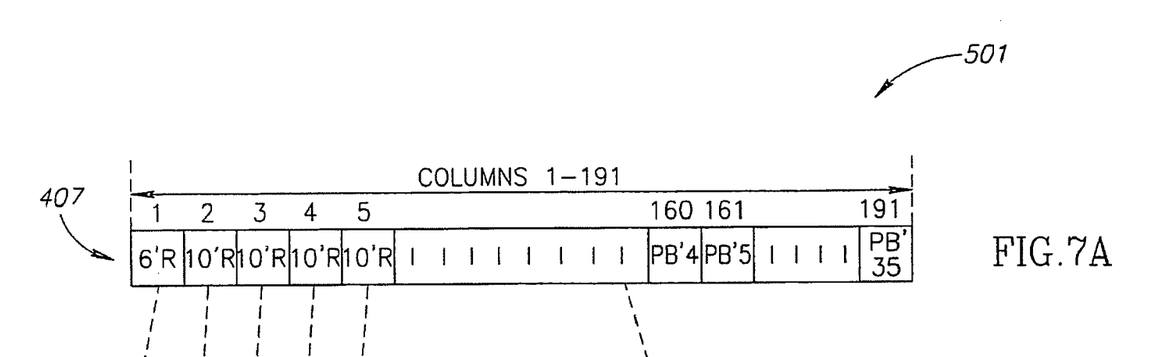
FIG. 7a schematically shows an exemplary row in the reduced table prior to processing by the controller in accordance with an embodiment of the present disclosure.
Figure 7B:
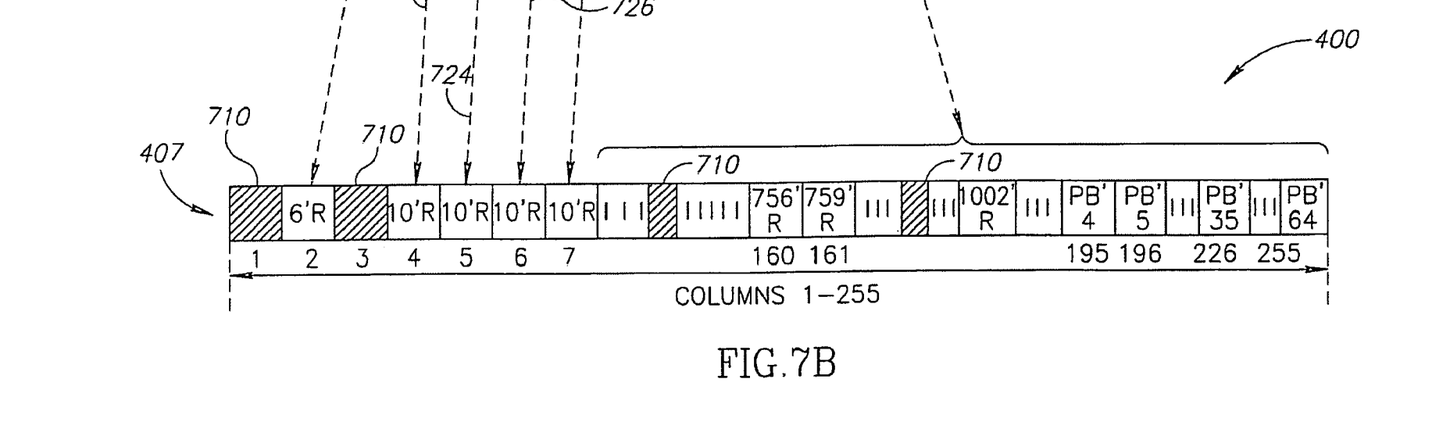
FIG. 7b schematically shows the exemplary row of FIG. 7a as seen by the decoder following processing of the information contained in the ESL in accordance with an embodiment of the present disclosure.

Reference is made to FIGS. 7a and 7b which schematically show exemplary row 407 of the reduced table 501 prior to processing by the controller, and the exemplary row 407 as seen by the decoder following processing of the information contained in the ESL, respectively, both figures in accordance with some embodiments of the present disclosure. In FIG. 7a row 407 in reduced table 501 is shown as stored in memory, without erasure bytes and including only reliable bytes and parity bytes. The controller reads from the ESL the address and the length of each erasure so that it knows in what byte position is the first byte of each erasure and how many rows and columns, or parts of rows and columns, each erasure occupies.

For example, the controller accesses the ESL which contains information about erasure bytes that were located in column 1 row 407 and column 3 row 407 in table 401 in FIG. 4. There is also information about a plurality of erasures bytes distributed throughout other byte positions in row 407. Referring to FIG. 7b row 407 is shown as it appears to the decoder which is similar to how the row appears when the complete MPE-FEC frame 400 of FIG. 4 is stored in memory in the current art. The controller, when transferring the reliable bytes and the parity bytes to the decoder, introduces delays 710 where the erasure bytes should have been. The decoder interprets the delay as erasure bytes. Thus, when the data in row 407 of FIG. 7a is transferred to the decoder reliable byte 6'R in column 1 is transferred with a delay equivalent to its occupying the position of column 2 row 407, as shown by dashed line 720, its byte position essentially shifted over by one byte. The decoder, due to the delay in receiving byte 6'R, interprets that there is an erasure byte 710 in column 1 row 407. The decoder then receives byte 10'R with delay equivalent to its occupying column 4 row 407, shown by datched line 722, and interprets that there is an erasure byte 710 in column 3 row 407. The decoder then receives byte 10'R with delay equivalent to its occupying column 5, row 407, as shown by datched line 724, and then 10'R with delay equivalent to its occupying column 6, row 407, as shown by dashed line 726, followed by 10'R with delay equivalent to its occupying column 7, row 407, as shown by dashed line 728. Essentially, byte 6'R was shifted over one byte position from column 1 in FIG. 7*a* to column 2 in FIG. 7*b* as it followed one erasure byte, and the four consecutive bytes 10'R were shifted over by two byte positions from columns 2-5 in FIG. 7*a* to columns 4-7 in Figure b, respectively, as they followed two erasures byte.

The decoder continues to receive all subsequent reliable bytes and parity bytes stored in memory in row 407 of reduced table 501 in FIG. 7*a*, the spacing or shift between them dictated by the information stored in the ESL regarding the location of the erasure bytes. This is shown by the dashed line 730.

The decoder does not differentiate between reliable bytes and parity bytes. These are continuously sent row-by-row to the decoder the spacing between the bytes dictated by the erasures bytes. A counter monitors the number of bytes and erasure bytes (recorded in the ESL) to be transferred in each row to the decoder. If the row length is less than 255 bytes, erasure bytes are introduced at the end of the row to complete the 255 bytes required for the decoding. Decoding is performed if there are no greater than 64 erasure bytes in each row.

In some embodiments of the present disclosure the ESL may be replaced by a Reliable Section List (RSL). The RSL is essentially a list stored in memory in which is recorded, for each reliable IP datagram, its address in the Application data table and the length of the datagram.

When the data in memory is ready to be decoded the RSL is accessed by the controller in the receiver, which uses the information available on the reliable IP datagrams to transfer the reliable bytes and the parity bytes to the decoder according to their original position within the MPE-FEC frame. Decoding of the data stored in memory is done row-by-row in the reduced table. The controller checks the RSL to see the original position of reliable bytes within each row of the Application data table, goes through each line in the reduced table stored in memory, then sends each row for decoding, the timing in the transfer of the reliable bytes and parity bytes taking into consideration the timing required to transfer the erasure bytes should they not have been removed. A delay in the sequence of the reliable bytes represents one or more erasure bytes in series, depending on the length of the delay. Then, in each row each reliable byte and parity byte following an erasure byte is shifted over one byte for each erasure byte that appears before it. The decoder then reads the empty positions between the reliable bytes and parity bytes as erasure bytes.

Additional embodiments of the present disclosure may include both an ESL and a RSL in which case the controller has both the information regarding the address and length of all reliable IP datagrams and also the address and length of all erasures.

In some embodiments of the present disclosure the erasures may be first placed in memory and later removed prior to the reception of the FEC data. Erasures are removed from the Application data table in the same order they are received, that is, starting from the top of column 1 and moving down to the end of column 1, then up to the top of column 2 and moving down to the end of column 2, then up to the top of column 3, and so on sequentially until all erasures are removed from the 191 columns. Shifting of reliable bytes and parity bytes into vacant positions and free positions may be done as the erasures are being removed, or optionally, after they are all removed Erasures may appear in all columns or some columns of the Application data table. According to some embodiments of the present disclosure the erasures may be removed in a different order than they are received, generally before reception of FEC data.

Another embodiments of the present disclosure may include storing the parity bytes in the byte positions occupied, or which would have been occupied, by the erasure bytes in memory. The byte positions of the erasure bytes will be left vacant until all reliable IP datagrams are received. The reliable bytes are placed in their respective byte positions in each row as originally allocated in the MPE-FEC frame. The vacant positions are occupied by RS data bytes from the FEC as they arrive at the buffer. Each FEC section occupies a whole column in the RS data table and is the same length as the columns in the Application data table, so that each parity byte arriving is associated with a specific row in the Application data table. Therefore, as the first FEC section arrives the parity bytes are shifted into the first free byte position in the lowest numbered column in each row of the Application data table corresponding to the same row allocated in the RS data table to the parity bytes. This process is repeated with the second FEC section, and subsequently with all FEC sections until all 191 columns in all rows of the Application data table are full. Monitoring of the number of columns filled in each row with reliable bytes and parity bytes may be performed with a counter. Additional parity bytes received for each row may be discarded when the row fills up. If the counter shows that the row is filled up with reliable bytes only (no erasure bytes in the row) parity bytes are not required and may be discarded.

When the data in memory is ready to be decoded the ESL is accessed by the controller in the receiver, which uses the information available on the erasures to transfer the reliable bytes and the parity bytes to the decoder according to their original position within the MPE-FEC frame. Decoding of the data stored in memory is done row-by-row in the reduced table. The controller checks the ESL to see the original position of erasure bytes within each row of the Application data table, goes through each line in the reduced table stored in memory, then sends each row for decoding, the timing in the transfer of the reliable bytes and parity bytes taking into consideration the timing required to transfer the erasure bytes should they not have been removed. As the byte positions originally destined for the erasure bytes are occupied by the parity bytes, as the row is being transferred to the decoder the parity bytes are copied to the back of the row in the same order they were received. The decoder receives the reliable bytes together with the empty byte positions corresponding to the erasure bytes, and then followed by the parity bytes which have been copied to the end of the row.

Figure 8A:
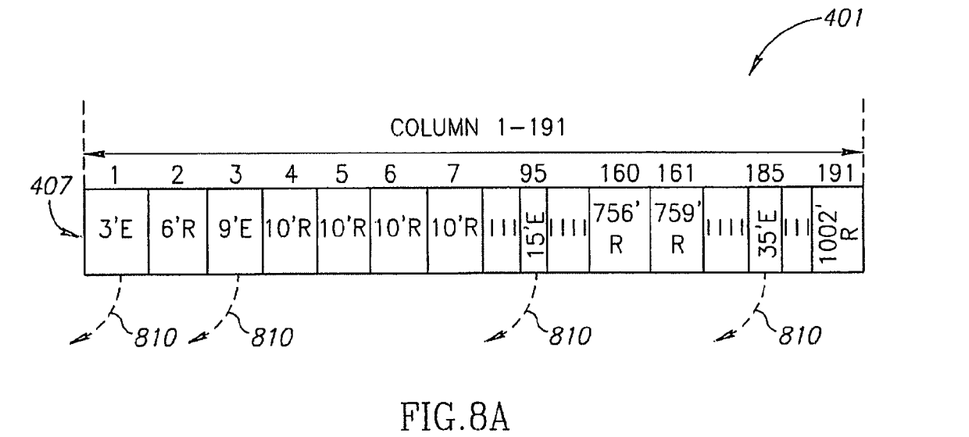
FIG. 8a schematically shows an exemplary row in the Application data table of FIG. 4 comprising erasure bytes.
Figure 8B:
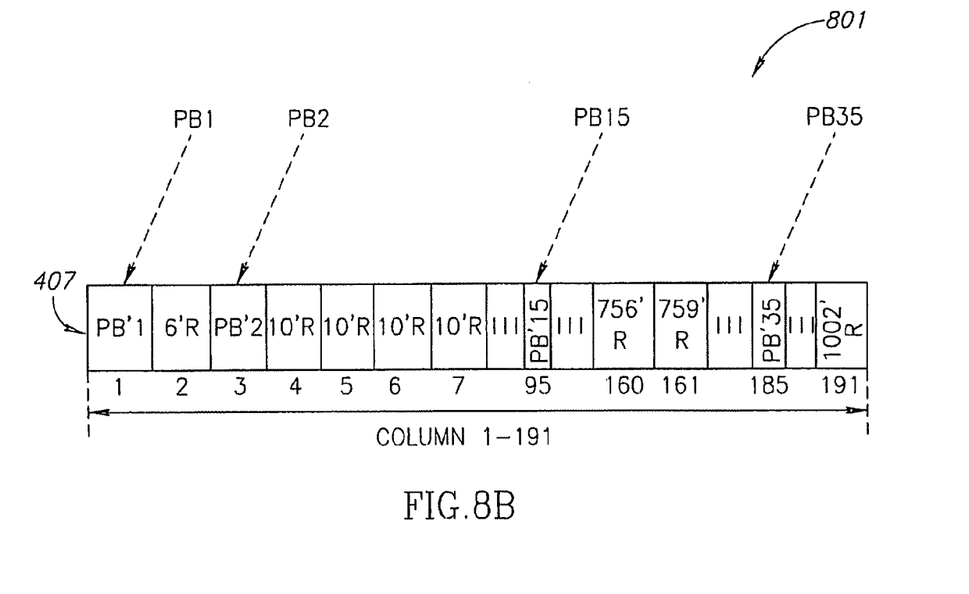
FIG. 8b schematically shows the exemplary row of FIG. 8a in a reduced table after insertion of parity bytes in accordance with another embodiment of the present disclosure.

Reference is made to FIGS. 8*a* and 8*b* which schematically show the exemplary row 407 in the Application data table 401 of FIG. 4 comprising erasure bytes, and exemplary row 407 in reduced table 801 following the insertion of parity bytes, in accordance with another embodiment of the present disclosure. For convenience, individual datagram bytes are identified by the number of the datagram to which they belong followed by a "prime" symbol, ', and the attached letter "R" or "E" identifying the bytes as reliable or as erasure bytes. For example, byte 6'R 411 is a reliable byte located in column 2 row 407 and is part of reliable datagram 6R 415 in FIG. 4. Byte 9'E 413 is an erasure byte located in column 3 row 407 and is part of erasure 9E 420 in FIG. 4.

In FIG. 8*a* row 407 includes erasure bytes in column 1 and in column 3. Also in row 407 is a plurality of erasures included among reliable bytes located between columns 7 and 160 and between columns 161 and 191, for example 15'E in column 95 and 35'E in column 185, respectively. The non-insertion of the erasures into row 407 is indicated at 810.

Filling up the vacant position in column 1, 3'E, is done by inserting parity byte PB'1 in its place. Filling up the vacant position in column 3, 9'E, is done by inserting parity byte PB'2 in its place. Filling up the vacant position in column 95 15'E, is done by inserting parity byte PB'15 in its place. Filling up the vacant position in column 185, 35'E, is done by inserting parity byte PB'35 in its place.

FIG. 8b, row 407 shows the result of inserting parity bytes in place of the vacant positions in row 407 of FIG. 8a. Starting from the lowered numbered columns and sequentially increasing to higher numbered columns each unoccupied byte position in each row is filled by a parity byte from the same row in the RS data table as the parity bytes arrive in memory. For example, parity byte PB'1, occupying column 1 row 407 in reduced table 801, is a parity byte from FEC section 1, PB1, originally intended to occupy column 1 row 407 in an RS data table (not shown) associated with Application data table 401 in FIG. 4. Parity bytes PB'2, PB'15 and PB'35, occupying columns 3, 95 and 185 respectively, in row 407 of reduced table 801, are parity bytes from FEC section 2, PB2, FEC section 15, PB15, and FEC section 35, PB35, and were originally intended to occupy columns 3, 15 and 35, respectively, row 407 in the RS data table associated with Application data table 401 in FIG. 4. In the example illustrated in FIG. 8b row 807 in reduced table 801 is filled with reliable bytes from the original 191 bytes in row 407 of the received table 401, and with parity bytes in row 407 columns 1 through 35 in the RS data table. Row 407 in reduced table 801 occupies a total of 191 columns.

Figure 9A:
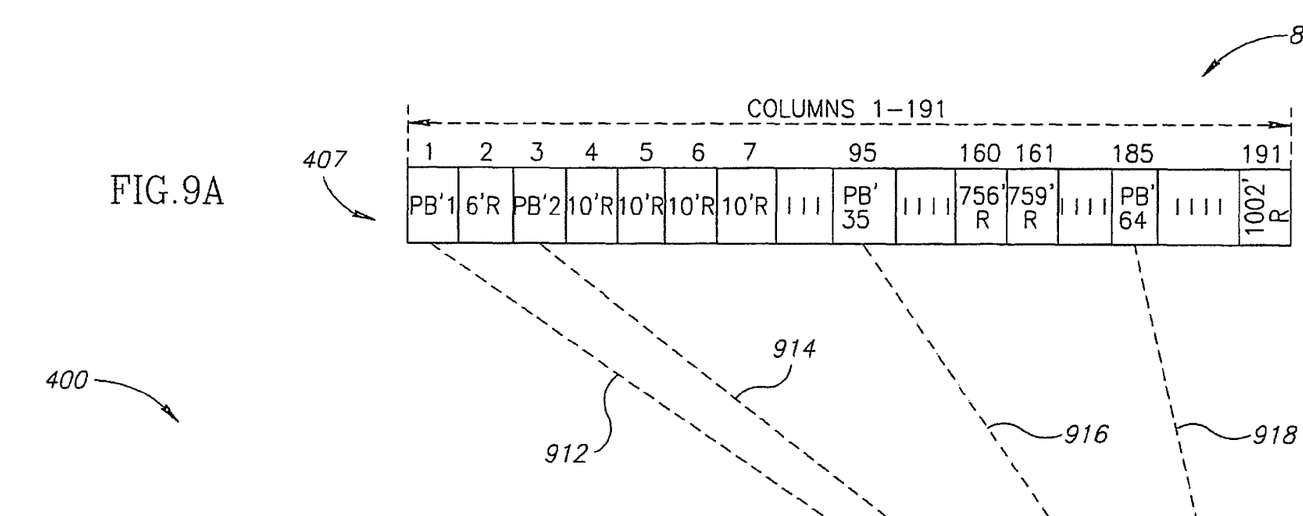
FIG. 9a schematically shows an exemplary row in the reduced table prior to processing by the controller in accordance with another embodiment of the present disclosure.
Figure 9B:
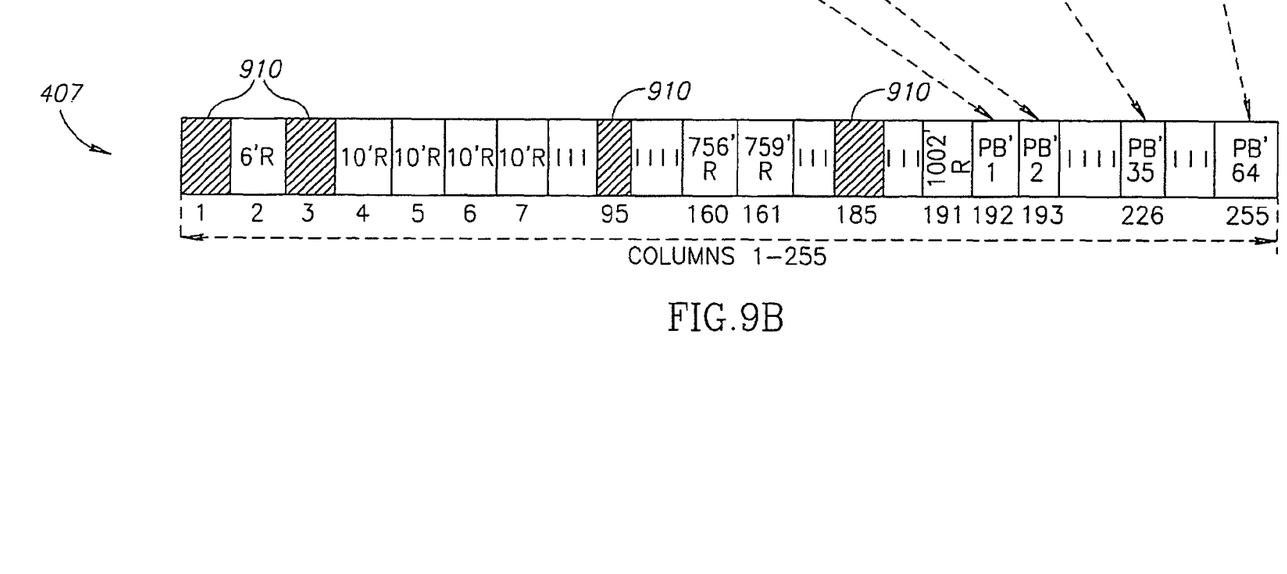
FIG. 9b schematically shows the exemplary row of FIG. 9a as seen by the decoder following processing of the information contained in the ESL in accordance with another embodiment of the present disclosure.

Reference is made to FIGS. 9a and 9b which schematically show the exemplary row 407 of the reduced table 801 prior to processing by the controller, and exemplary row 407 as seen by the decoder following processing of the information contained in the ESL, respectively, both figures in accordance with other embodiments of the present disclosure. In FIG. 9a row 407 in reduced table 801 is shown as stored in memory, without erasure bytes and including only reliable bytes and parity bytes. The controller reads from the ESL the address and the length of each erasure so that it knows in what byte position is the first byte of each erasure and how many rows and columns, or parts of rows and columns, each erasure occupies.

For example, the controller accesses the ESL which contains information about erasure bytes 910 that were located in column 1 row 407, column 3 row 407, column 95 row 407 and column 185 row 407, in table 401 in FIG. 4. There is also information about a plurality of erasures bytes distributed throughout other byte positions in row 407. Referring to FIG. 9b row 407 is shown as it appears to the decoder which is similar to how the row appears when the complete MPE-FEC frame 400 of FIG. 4 is stored in memory in the current art. The controller, when transferring the reliable bytes and the parity bytes to the decoder, indicates to the decoder that there is an erasure byte 910 at column 1 row 907 and copies the parity byte in column 1 row 907 to the end of the row. This is represented by dashed line 912. The controller also indicates to the decoder, for example, that there are erasure bytes 910 at columns 3, 95 and 185, respectively, in row 907 and copies the parity bytes at these byte positions to the end of the row, as shown by dashed lines 914, 916 and 918, respectively. The parity bytes PB'36-PB'64 in row 407, following PB'35, are padding bytes.

The decoder does not differentiate between reliable bytes and parity bytes. These are continuously sent row-by-row to the decoder the spacing between the bytes dictated by the erasures bytes. A counter monitors the number of bytes and erasure bytes (recorded in the ESL) received for each row by the decoder. If the row length is less than 255 bytes, erasure bytes are introduced at the end of the row to complete the 255 bytes required for the decoding. Decoding is performed if there are no greater than 64 erasure bytes in each row.

Figure 10:
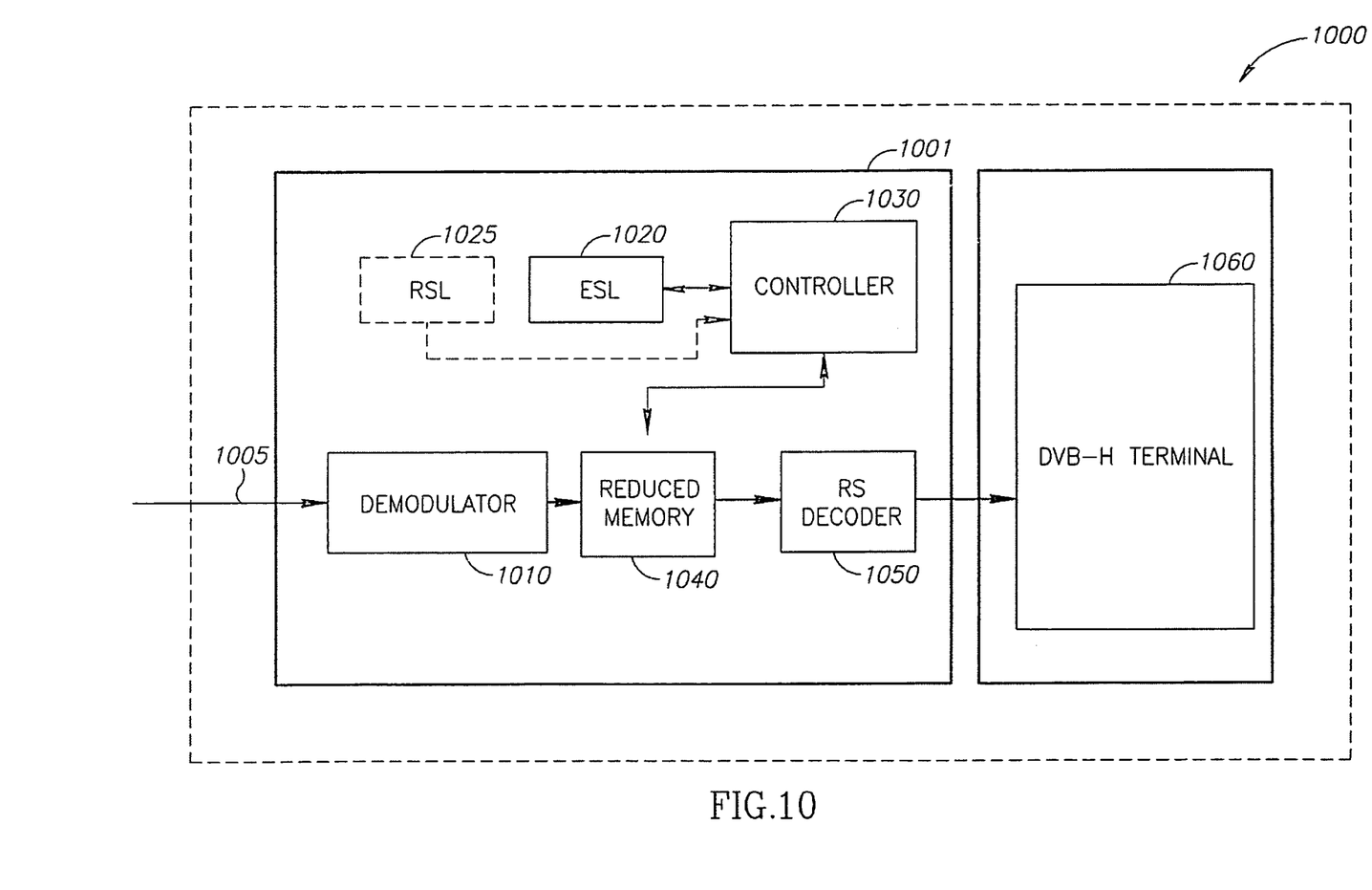
FIG. 10 schematically shows an exemplary conceptual block diagram of a System including a typical DVB-H receiver incorporating the method in accordance with an embodiment of the present disclosure.

Reference is made to FIG. 10 which schematically shows an exemplary conceptual block diagram of a system 1000 including a typical DVB-H receiver 1001, hereinafter referred to as "receiver" which incorporates the method in accordance with an embodiment of the present disclosure, and a DVB-H Terminal 1060. System 1000 may include any fixed and/or mobile and/or portable system in which may be adapted receiver 1001, for example portable computers, indoor and/or outdoor use equipment incorporating electronic devices, handheld communications systems, vehicles, and others.

Receiver 1001 receives DVB-H data 1005 from DVB-H transmitter (not shown) and/or DVB-T transmitter (not shown), in MPE-FEC packets in accordance with some embodiments of the present disclosure, although in other embodiments of the present disclosure the transmissions 1005 may include MPE packets, MPEG-2 Transport Stream Packets, and other transmission formats included in the DVB services. Demodulator 1010 recovers the IP datagrams and FEC sent in the MPE-FEC packets. Following CRC checking of the IP datagrams and the FEC, the reliable bytes and parity bytes from the IP datagrams and the FEC, respectively, are stored in the Reduced Memory 1040 in accordance with some of the embodiments of the method described by the present disclosure. Reduced Memory 1040 is essentially a buffer with an allocated 1.5 Mbit storage space to handle an MPE-FEC packet, although in other embodiments of the present disclosure Reduced Memory 1050 may allocate storage space greater than 1.5 Mbit and less than 2 Mbit, for example, greater than 1.5 Mbit and less than 1.6 Mbit, greater than 1.6 Mbit and less than 1.8 Mbit, greater than 1.8 Mbit and less than 2.0 Mbit. ESL 1020 is a relatively small memory which holds the address and length of all the erasures detected during the CRC. In other embodiments of the present disclosure ESL 1020 may be replaced by RSL 1025, and in some other embodiments of the present disclosure may also be included in receiver 1001 in addition to ESL, 1020 ESL 1020 and/or RSL 1025 are accessed by the Controller 1030 when sending the data in the Reduced Memory 1040 to the RS Decoder 1050 for decoding. RS Decoder 1050 is a 64-bit RS decoder although other embodiments of the present disclosure may include other types of decoders, for example a 32-bit RS decoder. The decoded IP datagrams are sent to DVB-H Terminal 1060 which includes means to output the IP datagrams as audio and video images.

It is noted that whereas the above description relates to CRC coding for error detection, practice of the present invention is not limited to CRC coding. For example, error detection coding other than CRC coding that detects error in a segment or portion of data but cannot or sometimes does not provide an indication as to where the error is located in the segment or portion may be used in the practice of the invention. For example, checksum coding or a block code that does not converge may be used to indicate or define erasures for which memory space is freed up for storage of data that is not indicated as being erroneous. In addition, practice of the invention is not limited to DVB-H data. The invention may be practiced for storing any data encoded with error detection coding that cannot or sometimes does not indicate where a detected error is located. In the description and claims of embodiments of the present invention, each of the words, "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention Some embodiments of the invention utilize only some of the features or possible combinations of the features. Variations of embodiments of the invention that are described and embodiments of the invention comprising different combinations of features noted in the described embodiments will occur to persons with skill in the art. The scope of the invention is limited only by the claims.

The invention claimed is:

1. A method of storing DVB-H data from a DVB-H data burst, the method comprising:
   identifying erasures in the data burst; and
   storing non-erasure data from the data burst in memory locations of a memory that would be used to store erasures.

2. A method according to claim 1 wherein the non-erasure data comprises reliable data.

3. A method according to claim 1 wherein the non-erasure data comprises redundancy data.

4. A method according to claim 1 wherein storing the non-erasure data comprises storing erasures and replacing the stored erasures with non-erasure data.

5. A method according to claim 1 and comprising storing memory locations for which non-erasure data is stored in place of erasure data.

6. A DVB-H receiver for receiving a DVB-H data burst, the receiver comprising:
   a memory for storing data from a DVB-H data burst; and
   a controller;
   wherein the controller identifies erasures in the data burst and stores non-erasure data from the data burst in locations of the memory that would be used to store the erasures.

7. A DVB-H receiver according to claim 6 wherein the non-erasure data comprises reliable data.

8. A DVB-H receiver according to claim 6 wherein the non-erasure data comprises redundancy data.

9. A DVB-H receiver according to claim 6 wherein the controller first stores erasures in the memory and then replaces the erasures with non-erasure data.

10. A DVB-H receiver according to claim 6 wherein the controller stores memory locations for which non-erasure data is stored in place of erasure data.

11. A method of storing in a memory data comprising error detection coding for determining presence of errors in portions of the data but cannot or does not indicate where in the portions the error is located and redundant data for correcting errors in the data, the method comprising:
   determining portions of the data that comprise an error responsive to the error detection coding; and
   storing portions of data that are not indicated by the error detection coding as having an error in memory locations that would otherwise be stored with data indicated by the error detection coding as having an error.

12. A method according to claim 11 wherein storing portions of data that are not indicated as having an error comprises storing data that is not redundant data.

13. A method according to claim 11 wherein storing portions of data that are not indicated as having an error comprises storing redundant data.

14. A method according to claim 13 wherein storing redundant data comprises storing only an amount of redundant data required to correct portions of data indicated by the error detection coding as having an error.

15. A method according to claim 11 wherein the error detection coding comprises CRC coding.

16. A method according to claim 11 wherein the error detection coding comprises checksum coding.

17. A method according to claim 11 wherein the error detection coding comprises coding that has indicated that it has failed to correct an error that it has detected.

18. A method according to claim 17 wherein the error detection coding that has provided the indication comprises a block code.

* * * * *